Oct. 11, 1960 — A. L. STEGNER — 2,955,306
SURFACE CLEANING DEVICE
Filed Sept. 25, 1957 — 2 Sheets-Sheet 2
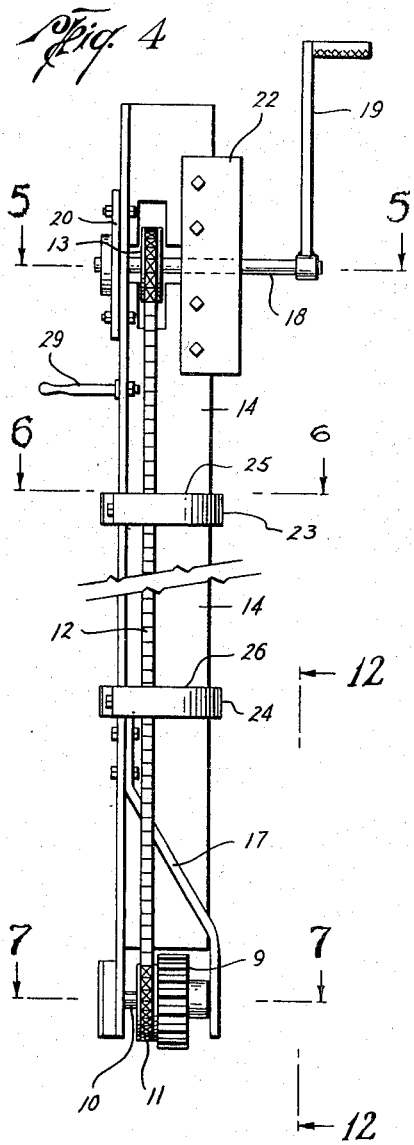
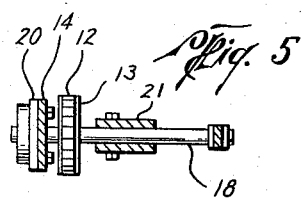
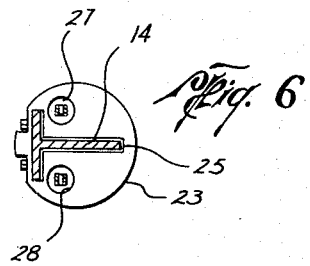
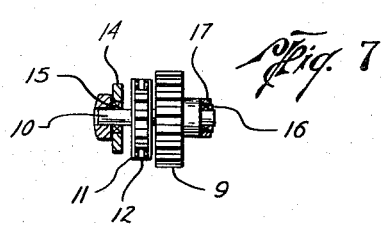
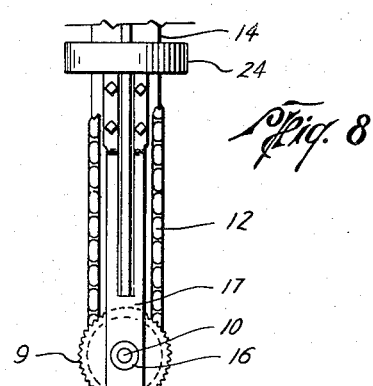
Albert L. Stegner
INVENTOR.

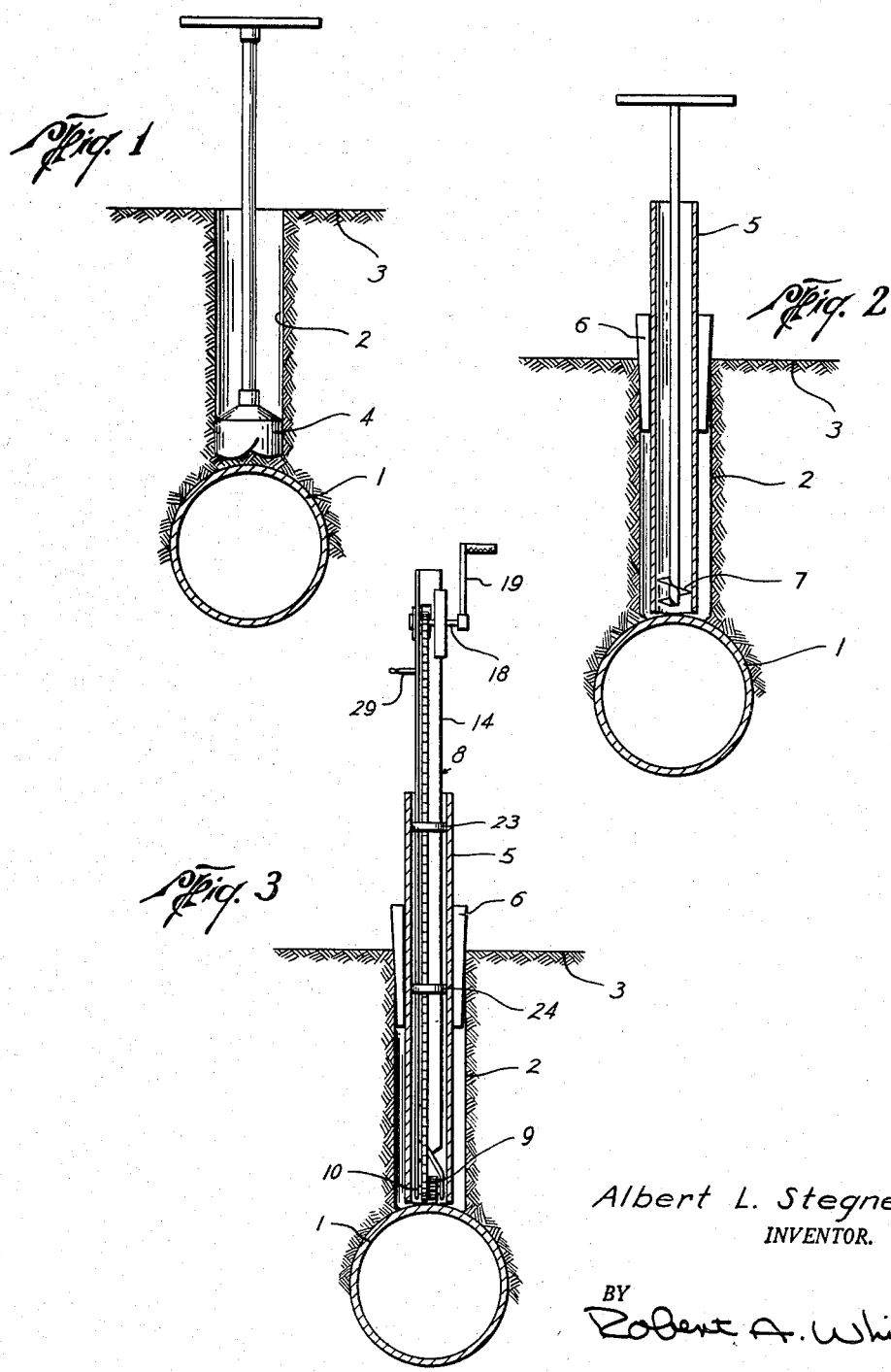

United States Patent Office 2,955,306
Patented Oct. 11, 1960

2,955,306

SURFACE CLEANING DEVICE

Albert L. Stegner, 2202 Dunstan St., Houston, Tex.

Filed Sept. 25, 1957, Ser. No. 686,235

2 Claims. (Cl. 15—93)

This invention relates to apparatus for attaching electrical conductors to buried metal objects and more particularly to apparatus for attaching test leads to underground pipes such as gas or oil conduits.

This application is a restricted application of my copending application Serial No. 315,593, filed October 18, 1952, now Patent No. 2,816,354.

It is frequently desirable and sometimes necessary to attach one end of each of several electrical conductors to a buried metal object in order to take electrical instrument readings, particularly in connection with corrosion control. In maintaining underground pipe lines, such as oil, gas or water lines, corrosion control is very important and test leads are attached and readings made at frequent intervals. These test leads are simply insulated small diameter wires attached, as by welding or soldering, to the pipe and extending above ground for ready attachment to the instruments.

Accordingly, it is an object of my invention to provide an improved cleaning apparatus by which a predetermined portion of the buried object can be cleaned to prepare it for the attachment of the test lead.

In carrying out my invention in a presently preferred manner I drill a hole of small diameter relative to its depth from the ground level to the upper surface of the buried object, and then lower a casing therein, preferably until it makes contact with the upper surface of the object. I lower in the casing a cleaning apparatus comprising an elongated frame carrying at its lower end a cutter or grinder operated either manually or automatically at ground level. This apparatus will clean an area on the surface of the pipe within the casing and, since the frame is adapted to be guided and positioned by the interior wall of the casing, the spot cleaned will be in a predetermined place relative to the casing axis. Preferably the frame guides are so arranged that the cleaned area will be in the center of the casing. A test lead is attached to the pipe, as by welding or otherwise.

My invention will be better understood from the following description taken in connection with the accompanying drawings, and its scope will be pointed out in the appended claims. In the drawings:

Fig. 1 is a sectional elevation showing a buried pipe to which a drilled hole has just been made by a hand auger which is shown in place within the hole;

Fig. 2 is a similar sectional view showing the casing in the bored hole with wedges securing it against the earth formation around the bore, and with a lightweight hand auger therein with its bladed end at the bottom of the casing;

Fig. 3 is a sectional view identical to that of Fig. 2 except that the cleaning apparatus is shown in position for operation in the casing, in place of the auger;

Fig. 4 is an elevation of a preferred form of a cleaning apparatus;

Fig. 5 is a sectional view along the lines 5—5 of Fig. 4;

Fig. 6 is a sectional view along the lines 6—6 of Fig. 4;

Fig. 7 is a sectional view along the lines 7—7 of Fig. 4;

Fig. 8 is an elevation along the lines 8—8 of Fig. 4.

Referring now to Fig. 1 of the drawings, there is illustrated a pipe 1 to which a hole or bore 2 has been drilled from ground level 3.

The next step, as shown in Fig. 2, is the insertion of a tubular casing 5, necessarily of smaller outside diameter than the hole 2, into position with its lower end either resting upon the buried member or closely adjacent to a surface thereof. In order better to be used as a guiding and positioning device, the casing should be maintained in a fixed position relative to the pipe and the earth formation; to this end I provide wedges 6, which may be merely blocks of wood, between the wall of the earth surrounding the hole 2 and the outer surface of the casing 5. While the casing is customarily secured in place in the center of the hole, it may be desirable to put it as far to one side thereof as possible when the drilling has not been exact enough to hit the center of the upper surface of the pipe. Consequently, when the casing is, for example, three inches in diameter and is placed within a six inch diameter hole, considerable latitude is allowed for correction of drilling error by placing the casing's lower end as near as possible to the desired portion of the surface of the pipe. Moreover, other means of minimizing the effect of failure to drill the hole in the exact center of the pipe are provided in connection with the operation of my preferred form of cleaning apparatus, as presently described.

The next step is the preparation of a suitable surface on the pipe so that the electrical conductor can be readily attached to it. It is important to predetermine the precise location of the prepared surface relative to the open lower end of the casing so that remote control welding can be successfully carried out. I prefer to use my novel and improved cleaning apparatus 8 as shown in Figs. 3, 4, 5, 6, 7 and 8. The apparatus 8 is lowered in the casing 5 until a milling cutter or equivalent device 9, fixed to a shaft 10 at its lower end, makes contact with the surface of the pipe 1.

Referring to Figs. 3 and 4 the milling cutter 9 is rotatably driven along with a sprocket wheel 11, also fixed to the shaft 10, by suitable means such as a chain 12 passing over the sprocket wheel 11 and at its upper end, a sprocket wheel 13. The cleaning apparatus is provided with an elongated frame 14 of a length greater than that of the casing with which it is adapted to be used, and the shaft 10 for the cutter is journaled within bearings 15 and 16, as shown in Fig. 7, formed respectively in the lower end of the frame proper and in an arm member 17 attached thereto. As best shown in Fig. 6 the frame is T-shaped, to add rigidity, over the major portion of its length and the drive chain passes respectively on opposite sides of the central portion of the T to form a complete loop. The upper sprocket wheel 13 is fixed to a shaft 18 to which is shown attached a crank 19 by which the cutter 9 can be manually rotated. The shaft 18 is journaled in the frame 14 as best shown in Figs. 4 and 5 with bearings 20 and 21 located respectively in the main rear portion of the frame and in a journal block 22 attached to the frame.

As previously explained it is important to clean the upper surface of the pipe at a predetermined spot relative to the lower end of the casing to insure that the welding device will deposit metal on a surface that has been prepared for it. To this end I provide positioning devices which are shown in Figs. 3, 4 and 6 in the form of collars 23 and 24 having an outside diameter just slightly smaller than the inside diameter of the casing with which the apparatus is adapted to be used. These positioning devices 23 and 24 are identical and are securely fixed to the supporting frame 14 of the cutting apparatus; they are provided with openings 25 and 26, respectively, through which the frame 14 passes, and are each provided with openings 27 and 28 through which the drive chain 12 passes. Since the casing 5 is fixed relative to the earth, and therefore relative to the pipe 1, and since the collars 23 and 24 serve as slidable guide members and centering devices to position the cleaning apparatus 8 within the casing, the cutter 9 will touch the surface of the pipe 1 at a point within a predetermined circle the diameter of which depends upon the eccentricity of the mounting of the cutter relative to the axis through the center of the collars, and on the width of the peripheral cutting surface.

In order to properly clean a portion of the upper surface of the pipe 1, I rotate the frame 14 of the cleaning apparatus 8, simultaneously with the rotation of the cutter, by means of a handle 29 carried by the frame. Naturally, the rotation of the frame 14 does not have to be continuous but it, instead may be shifted a few degrees at the time between which movements the operator will continue to turn the crank 19 to drive the cutter. In this manner, with the cutter slightly off-center with relation to the axis passing through the respective centers of the positioning collars 23 and 24, which corresponds with the axis of the casing, a substantially circular area is cleaned with a radius approximately equal to the distance from the edge of the cutter farthest from the casing axis to the said axis. For example, if the cutter has a cutting face ⅝ of an inch wide, with ⅛ of an inch on one side of the casing axis and ½ inch on the other side, the radius of the circle cleaned would then be approximately ½ inch. The reason for the slight overlap in the preferred form of my invention is to insure that the entire area within the circumference of the circle is cleaned even when there is excess tolerance between the positioning collars and the casing.

When the boring of the earth hole has not been accurate with the result that the hole reaches the pipe toward its side instead of on approximately the top center, and placing the casing near one edge of the hole fails to completely correct this condition, my cleaning apparatus will nevertheless clean and prepare a sufficiently large area to which the electrical conductor can be welded.

After the appropriate portion of the surface of the pipe 1 has been suitably cleaned or prepared as a welding surface the cleaning apparatus 8 is removed from the casing 5 and in its place is inserted a suitable welding device for attaching a test wire to the exposed and cleaned pipe.

While I have shown particular embodiments of my invention, it will be understood, of course, that I do not wish to be limited thereto since many modifications may be made; and I therefore contemplate by the appended claims to cover any such modifications as fall within the true spirit and scope of my invention.

What I claim as new and desire to secure by Letters Patent of the United States is:

1. Apparatus for cleaning an object accessible through an elongated hole comprising a tubular guide and guard casing for insertion in the hole, an elongated rigid frame for extension through said casing to the vicinity of the buried object, at least one annular guide member projecting from said frame for stably positioning the same for rotation in said casing about the axis thereof, supporting and manipulating elements located at one end of said frame for exposure above the ground, a movable, abrading element positioned at the opposite end of said frame for contacting the buried object, and an actuating connection extending along said frame between said manipulating and abrading elements.

2. Apparatus as described in claim 1 in which said abrading element is located eccentrically with relation to the axis of said casing so as to move circularly about the same, upon rotation of said frame in said casing, and thereby increase its cleaning field.

References Cited in the file of this patent

UNITED STATES PATENTS

| 421,044 | Brown | Feb. 11, 1890 |
| 1,236,307 | James | Aug. 7, 1917 |
| 1,239,406 | Krueger | Sept. 4, 1917 |
| 1,569,203 | Rice | Jan. 12, 1926 |
| 2,163,261 | Norton | June 20, 1939 |

FOREIGN PATENTS

| 91,459 | Austria | Feb. 26, 1923 |
| 255,695 | Germany | Jan. 18, 1913 |